(12) United States Patent
Kuriu et al.

(10) Patent No.: US 11,855,857 B2
(45) Date of Patent: Dec. 26, 2023

(54) NETWORK VIRTUALIZATION SYSTEM, VIRTUAL RESOURCE MANAGEMENT DEVICE, VIRTUAL RESOURCE MANAGEMENT METHOD AND PROGRAM

(71) Applicant: Nippon Telegraph and Telephone Corporation, Tokyo (JP)

(72) Inventors: Keiko Kuriu, Musashino (JP); Daisuke Hara, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/013,750

(22) PCT Filed: Jul. 3, 2020

(86) PCT No.: PCT/JP2020/026200
§ 371 (c)(1),
(2) Date: Dec. 29, 2022

(87) PCT Pub. No.: WO2022/003953
PCT Pub. Date: Jan. 16, 2022

(65) Prior Publication Data
US 2023/0300036 A1    Sep. 21, 2023

(51) Int. Cl.
*G06F 15/16* (2006.01)
*G06F 9/54* (2006.01)
*H04L 29/06* (2006.01)
*H04L 41/40* (2022.01)
*H04L 41/5051* (2022.01)

(52) U.S. Cl.
CPC .......... *H04L 41/40* (2022.05); *H04L 41/5051* (2013.01)

(58) Field of Classification Search
CPC .......................... H04L 41/40; H04L 41/5051
USPC .......................................................... 709/245
See application file for complete search history.

(56) References Cited

U.S. PATENT DOCUMENTS 10,263,911 B2 * 4/2019 Xiang .................. H04L 47/781
10,701,139 B2 * 6/2020 Li ........................ H04L 41/0893
11,397,605 B2 * 7/2022 Miyakoshi .......... H04L 43/0876
(Continued)

OTHER PUBLICATIONS

ETSI, "Network Functions Virtualisation (NFV) Release 2; Protocols and Data Models; NFV descriptors based on TOSCA specification," ETSI GS NFV-SOL 001 V2.6.1, May 2019, retrieved from URL <https://www.etsi.org/deliver/etsi_gs/NFV-SOL/001_099/001/02.06.01_60/gs_NFV-SOL001v020601p.pdf>, 232 pages.
(Continued)

*Primary Examiner* — Hamza N Algibhah
(74) *Attorney, Agent, or Firm* — Fish & Richardson P.C.

(57) ABSTRACT

Upon receiving a virtual network function (VNF) creation request including location information, a VNF manager (VNFM) of a network virtualization system transmits the VNF creation request to a VNF orchestrator (NFVO). Using the location information included in the VNF creation request, the NFVO extracts a virtual infrastructure manager (VIM) that satisfies the requirement of the location information with reference to the VIM information, and selects, from among the extracted VIMs, the VIM that satisfies a creation requirement other than the location information with reference to physical device/virtual resource information.

9 Claims, 9 Drawing Sheets

(56) References Cited

U.S. PATENT DOCUMENTS

| | | | | |
|---|---|---|---|---|
| 2016/0105332 | A1* | 4/2016 | Xiang | H04L 67/10 |
| | | | | 709/226 |
| 2016/0212017 | A1* | 7/2016 | Li | H04L 41/5048 |
| 2016/0381150 | A1* | 12/2016 | Rajagopal | H04L 41/40 |
| | | | | 709/223 |
| 2017/0288971 | A1* | 10/2017 | Jayaraman | H04L 41/5051 |
| 2018/0004563 | A1* | 1/2018 | Miyazaki | G06F 9/5077 |
| 2018/0011730 | A1* | 1/2018 | Zembutsu | H04L 41/0836 |
| 2018/0146031 | A1* | 5/2018 | Li | H04L 41/5009 |
| 2018/0181424 | A1* | 6/2018 | Gokurakuji | G06F 9/5077 |
| 2019/0058670 | A1* | 2/2019 | Zhu | H04L 12/6418 |
| 2019/0089588 | A1* | 3/2019 | Xu | H04L 49/253 |
| 2019/0089780 | A1* | 3/2019 | Yousaf | G06F 9/45533 |
| 2019/0104182 | A1* | 4/2019 | Elzur | H04L 67/125 |
| 2019/0363924 | A1* | 11/2019 | Tse | G06F 9/5077 |
| 2022/0158910 | A1* | 5/2022 | Santos | H04L 41/5009 |
| 2022/0225170 | A1* | 7/2022 | Xia | H04L 41/0895 |
| 2022/0329495 | A1* | 10/2022 | Xie | H04L 41/40 |
| 2023/0148302 | A1* | 5/2023 | Ping | H04W 24/02 |
| | | | | 370/254 |
| 2023/0217362 | A1* | 7/2023 | Sharma | H04W 24/02 |
| | | | | 370/329 |
| 2023/0261950 | A1* | 8/2023 | Xie | H04L 41/342 |
| | | | | 709/222 |

OTHER PUBLICATIONS

ETSI, "Network Functions Virtualisation (NFV) Release 2; Protocols and Data Models; RESTful protocols specification for the Or-Vnfm Reference Point," ETSI GS NFV-SOL 003 V2.6.1, Apr. 2019, retrieved from URL <https://www.etsi.org/deliver/etsi_gs/NFV-SOL/001_099/003/02.06.01_60/gs_NFV-SOL003v020601p.pdf>, 287 pages.

ETSI, "Network Functions Virtualisation (NFV) Release 2; Protocols and Data Models; RESTful protocols specification for the Ve-Vnfm Reference Point," ETSI GS NFV-SOL 002 V2.6.1, Apr. 2019, retrieved from URL <https://www.etsi.org/deliver/etsi_gs/NFV-SOL/001_099/002/02.06.01_60/gs_NFV-SOL002v020601p.pdf>, 217 pages.

* cited by examiner

Fig. 2

| Id | IDENTIFIER MANAGED BY VNFO |
|---|---|
| vimId | IDENTIFIER RELATED TO VIM |
| vimType | TYPE INFORMATION RELATED TO VIM |
| interfaceInfo | URI INFORMATION OF VIM AND PARAMETER INFORMATION RELATED TO vimType |
| accessInfo | AUTHENTICATION CREDENTIAL INFORMATION FOR ACCESSING VIM |
| extra | interfaceInfo/accessInfo OR OTHER RELATED PARAMETER INFORMATION |
| location | INFORMATION FOR IDENTIFYING AREA OF VIM OR weight INFORMATION INDICATING DISTANCE BETWEEN Vims |

Fig. 4

```
{
   "id": "4DFkow1",
   "vimId": "5023-4834-8964",
   "vimType": "OpenStack",
   "interfaceInfo":
"/vnflcm/v1/{vnfinstnceId}instantiate",
   "accessInfo": "VNFPkg/key",
   "extra":[
      "location": "Tokyo"
   ]
}
```

Fig. 5

```
{
  "id": "koe352lrwew1",
  "vimId": "2895-2124-8401",
  "vimType": "Kubernetes",
  "interfaceInfo": [
   "/vnflcm/v1/{vnfinstnceId}instantiate",
   "location-weight": "10"
   "accessInfo": "VNFPkg/key",
}
```

Fig. 8

```
testVNF:
  type: tosca.nodes.nfv.Vdu.Compute
  Properties:
    name: testvnf
    description: VNF for test
  capabilities:
    virtual_compute:
      properties:
        virtual_memory:
          virtual_mem_size: 8192 MiB
        virtual_cpu:
          cpu_architecture: x86
          num_virtual_cpu: 2
          virtual_cpu_clock: 1800 MHz
```

Fig. 9

| Id | IDENTIFIER MANAGED BY VNFO |
|---|---|
| vimId | IDENTIFIER RELATED TO VIM |
| vimType | TYPE INFORMATION RELATED TO VIM |
| interfaceInfo | URI INFORMATION OF VIM AND PARAMETER INFORMATION RELATED TO vimType |
| accessInfo | AUTHENTICATION CREDENTIAL INFORMATION FOR ACCESSING VIM |
| extra | interfaceInfo/accessInfo OR OTHER RELATED PARAMETER INFORMATION |

NETWORK VIRTUALIZATION SYSTEM, VIRTUAL RESOURCE MANAGEMENT DEVICE, VIRTUAL RESOURCE MANAGEMENT METHOD AND PROGRAM

CROSS-REFERENCE TO RELATED APPLICATIONS

This application is a National Stage application under 35 U.S.C. § 371 of International Application No. PCT/JP2020/026200, having an International Filing Date of Jul. 3, 2020.

The disclosure of the prior application is considered part of the disclosure of this application, and is incorporated by reference in its entirety into this application.

TECHNICAL FIELD

The present invention relates to a network virtualization system, a virtual resource management device, a virtual resource management method, and a program for managing virtual resources of a virtualized network.

BACKGROUND ART

In a recent carrier network, virtualization and cloud migration, that is, network functions virtualization (NFV) is in progress. In the NFV-enabled network system, a resource management system manages, as a virtual resource, the resource provided by a physical device, and performs reservation, assignment, collection, and the like in response to a user request.

In European Telecommunications Standards Institute (ETSI) NFV standards (see Non Patent Literatures 1, 2, and 3), a virtualized network function constructed on the NFV-enabled network system is referred to as a virtual network function (VNF). The function of performing lifecycle management of the VNF is referred to as a VNF manager (VNFM). The function of performing integrated operation management of the entire system is referred to as an NFV orchestrator (NFVO). The function of performing operation management of physical resources and virtual resources is referred to as a virtualized infrastructure manager (VIM). The physical resource that operates the VNF and a domain (base) of the virtualization function are referred to as NFV infrastructure (NFVI).

In the VNFM, an interface for lifecycle management of the VNF is prepared. Examples thereof include creation and deletion of the VNF. The creation of the VNF is to perform assignment of a necessary amount of virtual resources from the resource management system and perform appropriate initialization processing. Upon receiving a VNF creation request from the VNFM, the NFVO designates a VIM that manages a physical resource for executing the VNF as an appropriate deployment destination of the VNF. At this time, the NFVO executes NFV orchestration across multiple sites, and designates a VIM that manages a virtual resource that satisfies a necessary amount in consideration of VNF description (VNFD), network service descriptor (NSD), and VNF creation request API information. Note that the VNFD (details will be described later) is information describing a requirement required for the VNF to be created, and the NSD is information describing a requirement required for the network to be created.

CITATION LIST

Non Patent Literature

Non Patent Literature 1: "ETSI GS NFV-SOL 002 V2.6.1," [online], ETSI, 2019-04, [searched on Jun. 22, 2020], Internet <URL: https://www.etsi.org/deliver/etsi_gs/NFV-SOL/001_099/002/02.06.01_60/gs_NFV-SOL002v020601p.pdf>

Non Patent Literature 2: ETSI GS NFV-SOL 001 V2.6.1, "Network Functions Virtualisation (NFV) Release 2; Protocols and Data Models; NFV descriptors based on TOSCA specification," [online], ETSI, 2019-05, [searched on Jun. 22, 2020], Internet <URL: https://www.etsi.org/deliver/etsi_gs/NFV-SOL/001_099/001/02.06.01_60/gs_NFV-SOL001v020601p.pdf>

Non Patent Literature 3: ETSI GS NFV-SOL 003 V2.6.1, "Network Functions Virtualisation (NFV) Release 2; Protocols and Data Models; RESTful protocols specification for the Or-Vnfm Reference Point," [online], ETSI, 2019-04, [searched on Jun. 22, 2020], Internet <URL: https://www.etsi.org/deliver/etsi_gs/NFV-SOL/001_099/003/02.06.01_60/gs_NFV-SOL003v020601p.pdf>

SUMMARY OF INVENTION

Technical Problem

Examples in which the NFVO selects a VIM to be the deployment destination of the VNF include the following cases.

[Use case 1] A VIM is selected in order to select an NFVI that allows specifications (number of CPUs, memory, storage amount) of the VNF.

[Use Case 2] A VIM is selected in order to create a container type VNF.

[Use Case 3] A VIM is selected for creation of a VNF designating a specific (geographical) area.

The ETSI NFV standard specifies an interface and a means for selecting a VIM deployment destination, but does not specify a specific processing content.

In the case of [Use Case 1], the requirements and the like of the necessary amount of virtual resources are described in a descriptor called VNFD or NSD, and therefore there is no shortage in the means indicated in the ETSI NFV standard (Non Patent Literature 2).

FIG. 8 is a description example (VNFD) showing the specification of a VNF in the ETSI NFV standard.

As shown in FIG. 8, as the requirements for the necessary amount of virtual resources, the size of the virtual memory (virtual_mem_size: 8182 MiB), the number of virtual CPUs (num_virtual_CPU: 2), and the like are described as the VNFD.

In the case of [Use Case 2], it is possible to select an appropriate deployment destination by designating an identifier indicating a VIM capable of creating a container type VNF among request API parameters for creating a VNF according to the ETSI NFV standard (Non Patent Literature 3).

However, when it is desired to designate an area where a virtual resource or a VIM is installed as in the case of [Use Case 3], for example, in a case of a requirement that it is desired to dispersedly deploy a server (virtual machine) in a place near a user terminal, the NFVO and the VNFM cannot specify the virtual resource.

FIG. 9 is a view showing a parameter list related to VIM information in the ETSI NFV standard.

As shown in FIG. 9, "Id", "vimId", "vimType", "interfaceInfo", "accessInfo", and "extra" are defined as parameters related to conventional VIM information. "Id" is an identifier managed by the VNFO. "vimId" is an identifier related to the VIM. "vimType" is type information related to the VIM. "interfaceInfo" is URI information of the VIM and parameter information related to "vimType". "accessInfo" is authentication credential information for accessing the VIM. "extra" is "interfaceInfo"/"accessInfo" or other related parameter information.

Thus, in the parameters related to the VIM information of the ETSI NFV standard, there is no definition of a parameter that can specify the area. For this reason, in order to specify the installation place of the virtual resource and the VIM at a pin point, the service users (consumers) themselves have conventionally needed to grasp and manage the IP address of the VIM and determine and select the VIM that manages appropriate virtual resources.

The present invention has been made in view of such a point, and an object of the present invention is to improve work efficiency of specifying and selecting an area for a VIM that manages virtual resources.

Solution to Problem

A network virtualization system according to the present invention is a network virtualization system that creates a VNF on a virtual resource, the network virtualization system including: an NFVI that provides a virtual infrastructure by allocating the virtual resource on a plurality of physical devices; a VIM that controls the physical device and the virtual resource of the NFVI; an NFVO that selects a VIM that controls an NFVI that deploys a virtual resource that creates the VNF, from among a plurality of sets of the NFVI and the VIM deployed at any same position; and a VNFM that requests a selected VIM to allocate the virtual resource, in which the VNFM includes a VNF information management unit that, upon receiving a VNF creation request including location information in a creation requirement of the VNF, transmits the VNF creation request to the NFVO, and the NFVO includes: a storage unit that stores VIM information in which setting information regarding a VIM including location information regarding a deployment position of the VIM itself is stored and physical device/virtual resource information in which state information of the physical device and the virtual resource of each NFVI is stored; and a VIM selection unit that, by using the location information included in the VNF creation request, extracts a VIM that satisfies a requirement of the location information with reference to the VIM information, and selects, from among the extracted VIMs, a VIM that satisfies a creation requirement other than the location information with reference to the physical device/virtual resource information.

Advantageous Effects of Invention

According to the present invention, it is possible to improve work efficiency of specifying and selecting an area for a VIM that manages virtual resources.

BRIEF DESCRIPTION OF DRAWINGS

FIG. 2 is a view showing a parameter list related to VIM information according to the present embodiment.

FIG. 4 is an example in which VIM information according to the present embodiment is described in a JavaScript Object Notation (JSON) format.

FIG. 5 is an example in which VIM information according to the present embodiment is described in the JSON format.

FIG. 8 is a description example (VNFD) showing a specification of a VNF in the ETSI NFV standard.

FIG. 9 is a view showing a parameter list related to VIM information in the ETSI NFV standard.

DESCRIPTION OF EMBODIMENTS

Next, an embodiment for carrying out the present invention (hereinafter referred to as "present embodiment") will be described.

Figure 1:
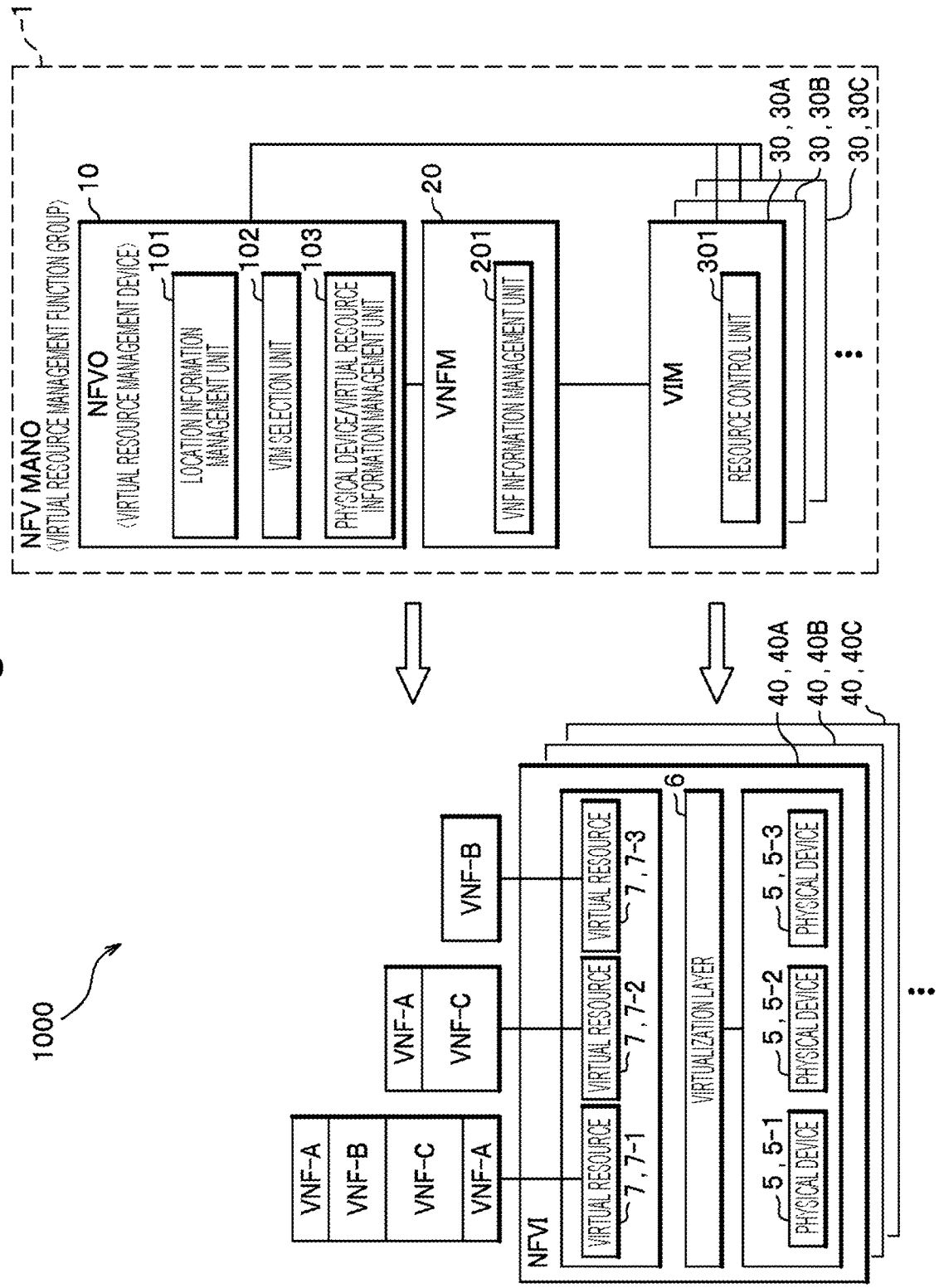
FIG. 1 is a view showing an overall configuration of a network virtualization system including a virtual resource management device according to the present embodiment.

FIG. 1 is a view showing an overall configuration of a network virtualization system 1000 including a virtual resource management device (NFVO 10) according to the present embodiment.

The network virtualization system 1000 includes one or more VNFs, an NFVI 40 serving as an infrastructure base for implementing the function of the VNF, and an NFVO 10, a VNFM 20, and a VIM 30, which are function groups (hereinafter referred to as "virtual resource management function group 1") that manage virtual resources for implementing the virtual network.

The VNF implements a virtualized network function by using a virtual resource 7 (in FIG. 1, virtual resources 7-1, 7-2, and 7-3) provided on a plurality of physical devices 5 (in FIG. 1, physical devices 5-1, 5-2, and 5-3). This VNF includes one or more virtual machines (VM) that implement a virtualized function by the virtual resource 7 being assigned. In FIG. 1, for example, a VNF-A is implemented by using a total of three virtual resources by two VMs using the virtual resource 7-1 on the physical device 5-1 and one VM using the virtual resource 7-2 on the physical device 5-2. A VNF-B is implemented by using a total of two virtual resources by one VM using the virtual resource 7-1 on the physical device 5-1 and one VM using the virtual resource 7-3 on the physical device 5-3. A VNF-C is implemented by using a total of two virtual resources by one VM using the virtual resource 7-1 on the physical device 5-1 and one VM using the virtual resource 7-2 on the physical device 5-2.

The NFVI 40 is an infrastructure base that executes the VNF, and includes the plurality of physical devices 5 (5-1, 5-2, and 5-3), which is physical hardware resources such as a computer, a storage, and network equipment, a virtualization layer 6 that is software that virtualizes these physical hardware resources, and the plurality of virtual resources 7 (7-1, 7-2, and 7-3) such as a virtual computer, a virtual storage, and a virtual network that are provided by the virtualization layer 6.

The virtual resource management function group 1 (NFVO 10, VNFM 20, and VIM 30) operates the entire network service and implements the function of NFV management and orchestration (NFV MANO) in the ETSI NFV standard (Non Patent Literature 1).

The VNFM 20 controls the lifecycle of the VNF. Specifically, the VNFM 20 receives a VNF creation request message (hereinafter referred to as "VNF creation request") from a client terminal or the like, and performs settings necessary for creation of the VNF.

Upon receiving the VNF creation request from the VNFM 20, the NFVO 10 selects the VIM 30 that satisfies the requirement of the VNF to be created. In particular, the NFVO 10 according to the present embodiment selects the VIM 30 in consideration of the deployment destination area indicated by the location information described later included in the VNF creation request.

The VIM 30 creates the virtual resource 7 in the NFVI 40 based on the request of the NFVO 10 and the VNFM 20.

In the network virtualization system 1000 according to the present embodiment, the virtual resource management function group 1 includes the parameter of "location" as a feature of the present embodiment into the parameter related to the conventional VIM information shown in FIG. 9, in order to specify the VIM 30 and the area of the NFVI 40 that creates the virtual resource 7 (see FIG. 2).

Specifically, as shown in FIG. 2, the parameter of "location" is included in the parameter related to the VIM information. This parameter of "location" is information for identifying an area or weight information indicating a distance between the VIMs 30 (details will be described later).

<Virtual Resource Management Function Group>

Next, details of the virtual resource management function group 1 of the network virtualization system 1000 according to the present embodiment will be described.

The NFVO 10, the VNFM 20, and the VIM 30 constituting this virtual resource management function group 1 (NFV MANO) can be installed as devices that implement each function on the network. In this case, each of the NFVO 10, the VNFM 20, and the VIM 30 is configured by a computer including a control unit, an input/output unit, and a communication unit. The VIM 30 is assumed to be positioned at the same location as that of the NFVI 40 corresponding to one position (location) where the physical device 5 is deployed. Then, a plurality of sets of the NFVI 40 (40A, 40B, 40C, . . . ), which provides the virtual resource 7 as an infrastructure, and the VIM 30 that manages each NFVI 40 that are deployed at each location is set. Although the set of the NFVI 40 and the VIM 30 is located in a predetermined area, a plurality of sets may be deployed in one area.

The NFVO 10 and the VNFM 20 are communicably connected to each VIM 30 (30A, 30B, 30C, . . . ) to transmit and receive information. The NFVO 10 and the VNFM 20 are also communicably connected to each other to transmit and receive information.

<<VNFM>>

The VNFM 20 receives a VNF creation request from a client terminal (not illustrated) or the like, and performs setting necessary for creation of a VNF for the virtual resource 7 allocated by the VIM 30 selected by the NFVO 10. As shown in FIG. 1, this VNFM 20 includes a VNF information management unit 201.

The VNF information management unit 201 receives, from a client terminal (not illustrated) or the like, a VNF creation request in which location information is included in a VNF creation requirement (VNFD and request API parameter).

The location information is information for specifying an area where the VIM 30 (and the NFVI 40) is deployed.

This location information is designated by parameters ("location") such as <1> identification information of a specific area, <2> weight information indicating a distance between VIMs (between a reference VIM and another VIM), and the like.

<1> As the identification information for a specific area, the name of area (Tokyo, Osaka, etc.), information on latitude/longitude, and the like are set as information on a place where the VIM 30 is installed.

<2> The weight information indicating the distance between the VIMs is information indicating the magnitude of the distance between the position of a reference VIM 30 (e.g., the position of the VIM 30 designated by the user) as a starting point and another VIM 30 by comparison with a predetermined distance (reference distance). That is, the weight information is information indicating the distance between the reference VIM 30 and each VIM 30 itself. For example, with the position of the VIM 30 designated by the user as a reference, the weight information of the VIM 30 set at a place distant from the position by the distance twice a predetermined distance is "2".

Upon receiving a VNF creation request including location information in the VNF creation requirement (VNFD or the like), the VNF information management unit 201 transmits the VNF creation request to the NFVO 10. Note that this processing is executed in granting processing normally performed by the VNFM at the time of creating the VNF in the NFV MANO.

Upon receiving information (selection result notification) of the VIM 30 to be the deployment destination of the VNF from the NFVO 10, the VNF information management unit 201 requests the VIM 30 to be the deployment destination to allocate the virtual resource 7 (hereinafter referred to as "virtual resource allocation request"), and executes processing (VNF creation processing) of performing necessary setting as the VNF for the allocated virtual resource 7.

<<VIM>>

The VIM 30 (30A, 30B, 30C, . . . ) manages, as a physical resource, each physical device 5 in the NFVI 40 associated with itself, and creates (allocates) the virtual resource 7 based on the information from the VNFM 20 and the NFVO 10. As shown in FIG. 1, this VIM 30 includes a resource control unit 301.

When selected by the NFVO 10 as the VIM 30 of the deployment destination, the resource control unit 301 receives a request for resource reservation (resource reservation request) from the NFVO 10 so that the requested virtual resource 7 can be reliably used in the VNFM 20, and reserves the virtual resource 7.

Then, the resource control unit 301 receives the virtual resource allocation request from the VNFM 20, thereby executing the allocation of the virtual resource 7 in the corresponding NFVI 40.

<<NFVO>>

The NFVO 10 (virtual resource management device) receives a VNF creation request including location information in a VNF creation requirement (VNFD or the like) from the VNFM 20, and selects the VIM 30 in consideration of the deployment position of the VIM 30 indicated in the location information. As shown in FIG. 1, this NFVO 10 is configured to include a location information management unit 101, a VIM selection unit 102, and a physical device/virtual resource information management unit 103.

As described above, this NFVO 10 can be implemented by a computer having the function of the NFVO in the ETSI NFV standard (Non Patent Literature 1). Therefore, hereinafter, the NFVO 10 will be described as one device (virtual resource management device) with reference to FIG. 3.

Figure 3:
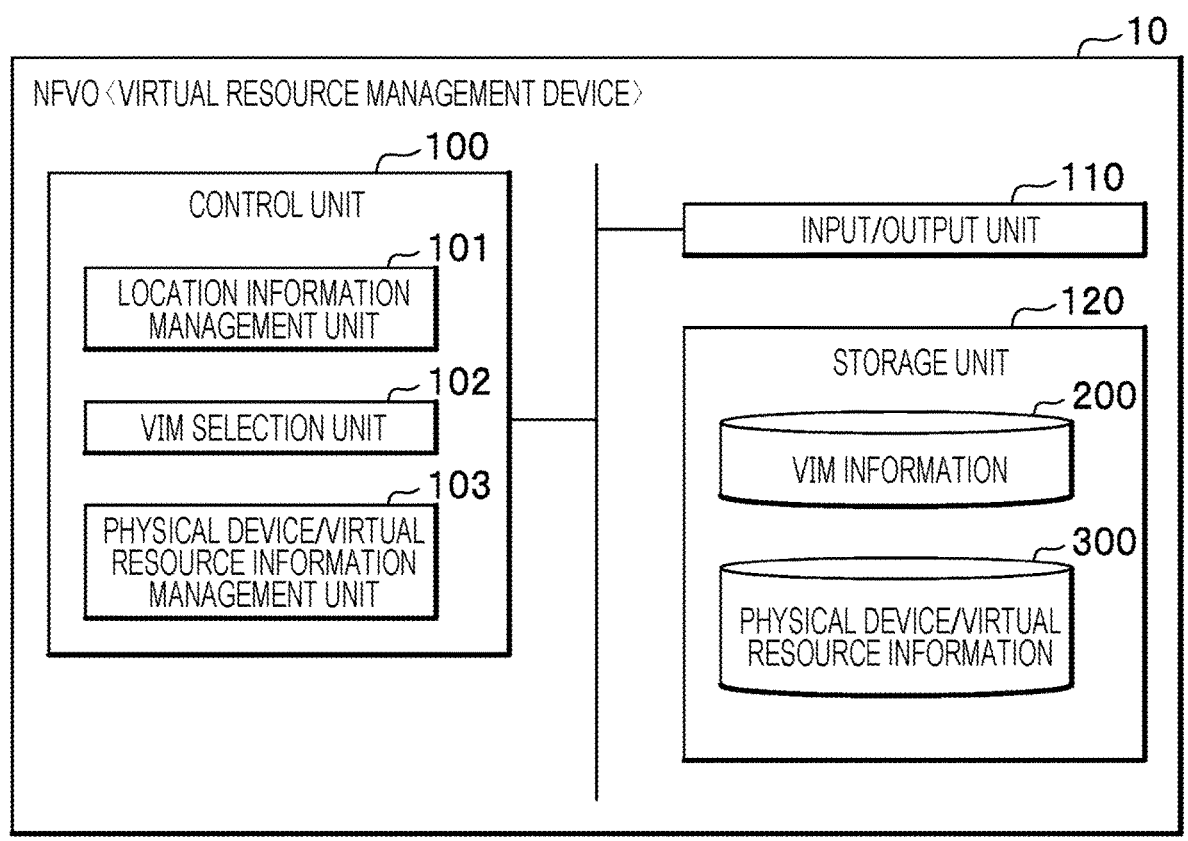
FIG. 3 is a functional block diagram showing a configuration of an NFVO (virtual resource management device) according to the present embodiment.

FIG. 3 is a functional block diagram showing the configuration of the NFVO 10 (virtual resource management device) according to the present embodiment. As shown in FIG. 3, this NFVO 10 includes a control unit 100, an input/output unit 110, and a storage unit 120.

The input/output unit 110 inputs/outputs information to/from the VNFM 20, each VIM 30, other external devices, and the like. This input/output unit 110 includes a communication interface that transmits/receives information via a communication line, and an input/output interface that inputs/outputs information to/from an input device such as a keyboard not illustrated and an output device such as a monitor.

The storage unit 120 includes a hard disk, a flash memory, and a random access memory (RAM). This storage unit 120 stores information necessary for the processing according to the present embodiment, such as VIM information 200 (See FIGS. 4 and 5 described later) and physical device/virtual resource information 300.

The storage unit 120 temporarily stores a program for executing each functional unit of the control unit 100 and information necessary for processing of the control unit 100.

The control unit 100 is configured to include the location information management unit 101, the VIM selection unit 102, and the physical device/virtual resource information management unit 103.

When a new VIM 30 is registered, the location information management unit 101 receives the VIM information 200 including the location information from a management terminal (not illustrated) or the like of the network virtualization system 1000, and stores the VIM information 200 in the storage unit 120. Note that, in a case where the VIM information 200 regarding the existing VIM 30 is stored in the storage unit 120, when acquiring the location information regarding the VIM 30 from the management terminal or the like, the location information management unit 101 adds and updates the location information to the VIM information 200 stored in the storage unit 120.

FIGS. 4 and 5 are examples in which the VIM information 200 stored in the storage unit 120 is described in a JavaScript Object Notation (JSON) format.

FIG. 4 shows an example in which the parameter of "location" indicating area identification information is described as ["location":"Tokyo"] as the parameter related to the VIM information as shown in FIG. 2.

FIG. 5 shows an example in which the parameter of "location" indicating weight information indicating the distance between VIMs is described as ["location-weight": "10"].

Note that, in addition to this, information indicating the latitude/longitude of the position where the VIM 30 is installed may be registered as the parameter of "location".

Thus, the location information in addition to the information indicating the specifications and the like of each VIM 30 is stored in the VIM information 200.

Returning to FIG. 3, upon receiving the VNF creation request including the location information in the VNF creation requirement (VNFD or the like) from the VNFM 20, the VIM selection unit 102 selects the VIM 30 in consideration of the deployment position of the VIM 30 indicated by the location information.

Specifically, the VIM selection unit 102 acquires location information included in the received VNF creation request, and, if the location information is identification information (e.g., "Tokyo") designating an area, extracts the VIM 30 located in the "Tokyo" area with reference to the VIM information 200. If the location information is information indicated by "latitude/longitude", the VIM selection unit 102 extracts the VIM 30 located within a predetermined distance (e.g., a radius of 1 km) from the position indicated by the latitude/longitude. If the location information is weight information indicating the distance between VIMs, the VIM selection unit 102 extracts the VIM 30 within a value indicated by the weight information (e.g., "10").

Note that if there is a plurality of VIMs 30 that satisfies the condition of the above-described location information, the VIM selection unit 102 extracts the plurality of VIMs 30.

Then, by referring to the physical device/virtual resource information 300 among the VIMs 30 that satisfy the requirement of the location information, the VIM selection unit 102 selects the VIM 30 that currently satisfies the requirement (size of virtual memory, number of virtual CPUs, and the like) of another necessary amount related to the creation of the VNF indicated by the VNFD or the like.

Note that the physical device/virtual resource information 300 stores current allocation information of the VNF allocated to the virtual resource created on each physical device 5 and current state information (information enabling confirmation of the number of unused CPU cores, the number of free memories, and the like) of the physical device 5 and the virtual resource 7.

If there is a plurality of VIMs 30 satisfying another creation requirement (VNFD or the like) of the VNF in addition to the requirement of the location information, the VIM selection unit 102 selects one VIM 30 from among the VIMs. At that time, the VIM selection unit 102 selects the VIM 30 closer to the position indicated by the latitude/longitude of the location information, or selects the VIM 30 having the lowest value indicated by the weight information.

When selecting the VIM 30 in which a VNF is newly deployed, the VIM selection unit 102 transmits a request for resource reservation (resource reservation request) to the selected VIM 30 so that the virtual resource 7 requested in the VNF creation request can be reliably used. Due to this, in the VIM 30 serving as the selection destination, the virtual resource 7 that satisfies the necessary amount requested by the VNF creation request is reserved and secured.

The VIM selection unit 102 notifies the VNFM 20 of the information of the VIM 30 selected as the deployment destination (selection result notification). Note that this processing corresponds to the response of the granting processing normally performed in the NFV MANO.

As the status of the resource in the NFVI 40 corresponding to each VIM 30 (30A, 30B, 30C, . . . ), the physical device/virtual resource information management unit 103 acquires, from the VIM 30 (30A, 30B, 30C, . . . ) and the VNFM 20, the allocation information on the VNF allocated to the virtual resources (7-1, 7-2, and 7-3) created on physical devices 5 (5-1, 5-2, and 5-3), respectively, and the state information (information enabling confirmation of the number of unused CPU cores, the number of free memories, and the like) of the physical device 5 and the virtual resource 7, and updates the physical device/virtual resource information 300 in the storage unit 120 to the latest state.

<Flow of Processing>

Next, the flow of processing of the network virtualization system 1000 including the NFVO 10 (virtual resource management device) will be described.

Figure 6:
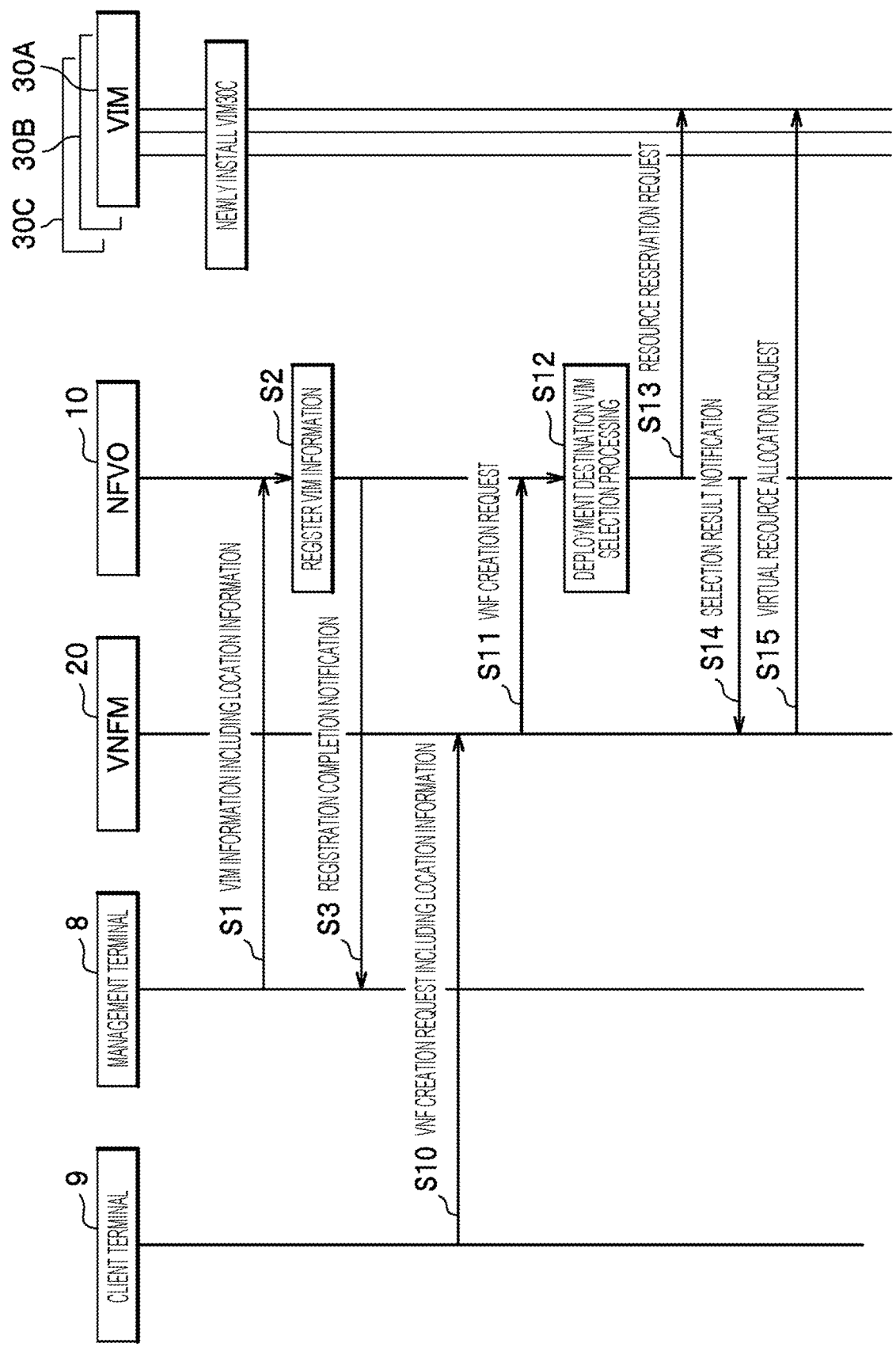
FIG. 6 is a flowchart showing a flow of processing of the network virtualization system including the NFVO (virtual resource management device) according to the present embodiment.

FIG. 6 is a flowchart showing the flow of processing of the network virtualization system 1000 including the NFVO 10 (virtual resource management device) according to the present embodiment.

FIG. 6 illustrates processing (location information registration processing) of registering the VIM information 200 (see FIG. 3) including the location information in the storage unit 120 of the NFVO 10 and processing (VNF creation processing) of receiving the VNF creation request, selecting the VIM 30 to be the deployment destination, and creating the VNF will be described. Note that the location information registration processing is performed in advance before the VNF creation processing.

<<Location Information Registration Processing>>

Here, the description will be given on the assumption that the VIM 30C is newly installed.

When the new VIM 30C is newly installed, the NFVO 10 acquires the VIM information 200 including the location information on the newly installed VIM 30 (VIM 30C) from a management terminal 8 or the like of the network virtualization system 1000 (step S1). Then, the location information management unit 101 of the NFVO 10 registers the acquired VIM information 200 in the storage unit 120 (step S2).

The location information management unit 101 transmits, to the management terminal 8 and the like, a notification (registration completion notification) indicating that the registration of the VIM information 200 is completed (step S3).

Note that, in the registration processing of the location information, in a case where the VIM information 200 of the existing VIM 30 has already been registered in the NFVO 10, as described above, only the location information may be acquired from the management terminal 8, and the location information management unit 101 may update the existing VIM information 200.

In place of acquiring location information from the management terminal 8, the NFVO 10 may acquire and register location information from the newly set VIM 30 (VIM 30C).

<<VNF Creation Processing>>

Next, the VNF creation processing will be described. Note that, here, it is assumed that the physical device/virtual resource information management unit 103 of the NFVO 10 has acquired the latest VNF setting information and state information of each NFVI 40 (40A, 40B, 40C, . . . ) via the VNFM 20 and each VIM 30 (30A, 30B, 30C, . . . ) and has updated the physical device/virtual resource information 300 in the storage unit 120.

First, the VNFM 20 receives a VNF creation request including location information in the VNF creation requirement (VNFD or the like) from the client terminal 9 (step S10).

Subsequently, the VNF information management unit 201 of the VNFM 20 transmits a VNF creation request including the received location information to the NFVO 10 as granting processing, which is processing of obtaining approval for VNF creation (step S11).

Upon acquiring the VNF creation request including the location information, the VIM selection unit 102 of the NFVO 10 executes deployment destination VIM selection processing (step S12).

Specifically, the VIM selection unit 102 acquires the location information included in the received VNF creation request, and, based on the location information, with reference to the VIM information 200, extracts the VIM 30 satisfying the requirement of the location information.

Here, if the location information is identification information (e.g., "Tokyo") designating an area, the VIM selection unit 102 extracts the VIM 30 located in the "Tokyo" area with reference to the VIM information 200. If the location information is information indicated by "latitude/longitude", the VIM selection unit 102 extracts the VIM 30 located within a predetermined distance (e.g., a radius of 1 km) from the position indicated by the latitude/longitude. If the location information is weight information indicating the distance between VIMs, the VIM selection unit 102 extracts the VIM 30 within a value indicated by the weight information (e.g., "10").

Then, by referring to the physical device/virtual resource information 300 among the extracted VIMs 30, the VIM selection unit 102 selects, as the deployment destination, the VIM 30 that satisfies the VNF creation requirement indicated by the VNFD or the like.

Subsequently, the VIM selection unit 102 transmits a resource reservation request to the VIM 30 (here, assumed to be VIM 30A) selected as the deployment destination (step S13). Due to this, in the selected VIM 30 (VIM 30A), the virtual resource 7 that satisfies the necessary amount requested by the VNF creation request is reserved and secured.

Next, the VIM selection unit 102 transmits, to the VNFM 20, a selection result notification including information on the VIM 30 (VIM 30A) selected as the deployment destination (step S14).

Upon receiving the selection result notification of the VIM 30, the VNFM 20 transmits a virtual resource allocation request to the VIM 30 (VIM 30A) to be the deployment destination (step S15). Due to this, the resource control unit 301 of the VIM 30 (VIM 30A) to be the deployment destination actually performs the allocation of the virtual resource 7 in the corresponding NFVI 40 (e.g., NFVI 40A). Then, the VNFM 20 performs setting processing necessary as a VNF on the allocated virtual resource 7 to create a VNF.

As described above, according to the network virtualization system 1000 including the NFVO 10 (virtual resource management device) according to the present embodiment, since the NFVO 10 (virtual resource management device) can select the optimal VIM 30 based on the location information, it is possible to improve work efficiency of specifying and selecting an area for the VIM 30 that manages virtual resource 7.

<Hardware Configuration>

Figure 7:
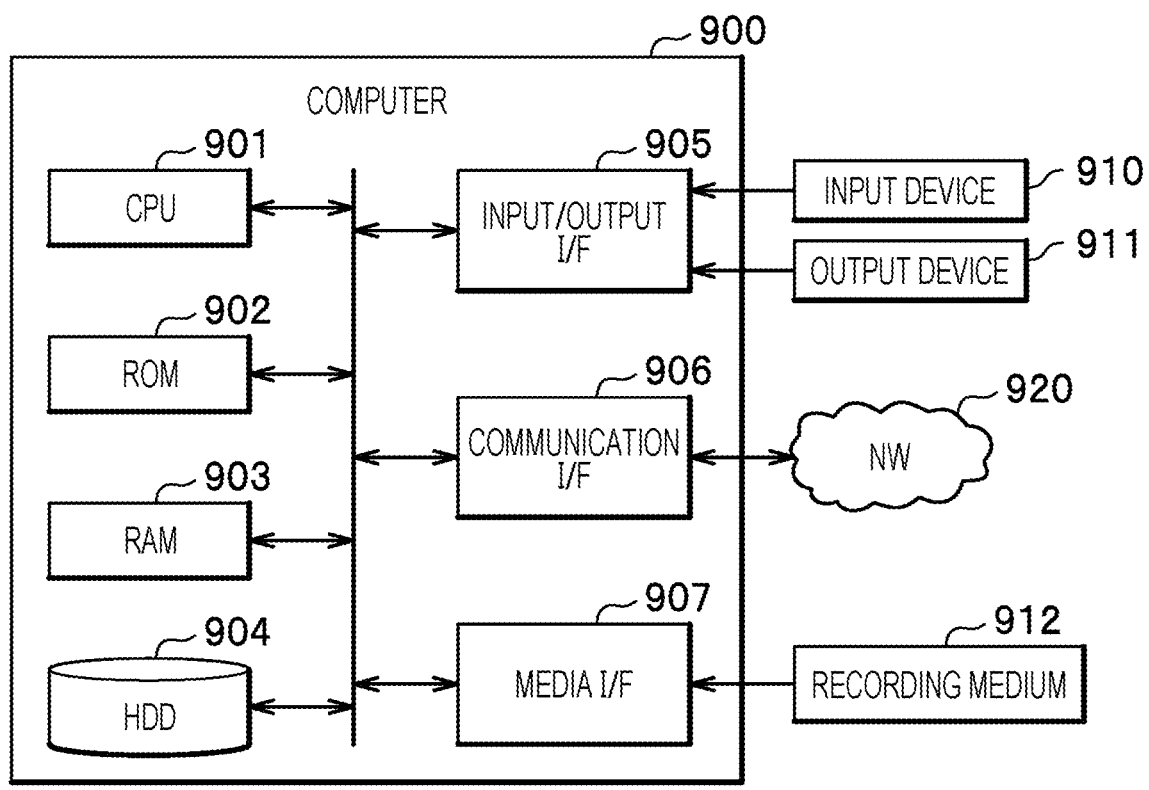
FIG. 7 is a hardware configuration diagram showing an example of a computer that implements a function of the NFVO (virtual resource management device) according to the present embodiment.

The NFVO 10 (virtual resource management device) according to the present embodiment is implemented by a computer 900 having a configuration as shown in FIG. 7, for example.

FIG. 7 is a hardware configuration diagram showing an example of the computer 900 that implements the functions of the NFVO 10 (virtual resource management device) according to the present embodiment. The computer 900 includes a CPU 901, a read only memory (ROM) 902, a RAM 903, a hard disk drive (HDD) 904, an input/output interface (I/F) 905, a communication I/F 906, and a media I/F 907.

The CPU 901 operates based on a program stored in the ROM 902 or the HDD 904, and performs control by the control unit 100 (the location information management unit 101, the VIM selection unit 102, and the physical device/virtual resource information management unit 103) of the NFVO 10 (virtual resource management device) shown in FIGS. 1 and 3. The ROM 902 stores a boot program executed by the CPU 901 at the time of starting the computer 900, a program related to hardware of the computer 900, and the like.

The CPU 901 controls an input device 910 such as a mouse and a keyboard and an output device 911 such as a display via the input/output I/F 905. Via the input/output I/F 905, the CPU 901 acquires data from the input device 910 and outputs created data to the output device 911. Note that a graphics processing unit (GPU) or the like may be used as the processor together with the CPU 901.

The HDD 904 stores a program executed by the CPU 901, data used by the program, and the like. The communication I/F 906 receives data from another device via a communication network (e.g., NW (network) 920) and outputs the data to the CPU 901, and transmits the data created by the CPU 901 to another device via the communication network.

The media I/F 907 reads a program or data stored in a recording medium 912, and outputs the program or data to the CPU 901 via the RAM 903. The CPU 901 loads a program related to target processing from the recording medium 912 onto the RAM 903 via the media I/F 907, and executes the loaded program. The recording medium 912 is an optical recording medium such as a digital versatile disc (DVD) or a phase change rewritable disk (PD), a magneto-optical recording medium such as a magneto optical disk (MO), a magnetic recording medium, a conductor memory tape medium, a semiconductor memory, or the like.

For example, when the computer 900 functions as the NFVO 10 (virtual resource management device) according to the present embodiment, the CPU 901 of the computer 900 implements the function of the NFVO 10 (virtual resource management device) by executing the program loaded onto the RAM 903. The HDD 904 stores data in the RAM 903. The CPU 901 reads a program related to the target processing from the recording medium 912 and executes the program. In addition to this, the CPU 901 may read a program related to the target processing from another device via the communication network (NW 920).

Effects

Hereinafter, effects of the network virtualization system 1000 and the like including the NFVO 10 (virtual resource management device) according to the present invention will be described.

The network virtualization system according to the present invention is the network virtualization system 1000 that creates a VNF on the virtual resource 7, the network virtualization system 1000 including: the NFVI 40 that provides a virtual infrastructure by allocating the virtual resource 7 on the plurality of physical devices 5; the VIM 30 that controls the physical device 5 and the virtual resource 7 of the NFVI 40; the NFVO 10 that selects the VIM 30 that controls the NFVI 40 that deploys the virtual resource 7 that creates the VNF, from among a plurality of sets of the NFVI 40 and the VIM 30 deployed at any same position; and the VNFM 20 that requests the selected VIM 30 to allocate the virtual resource 7, in which the VNFM 20 includes the VNF information management unit 201 that, upon receiving a VNF creation request including location information in a creation requirement of the VNF, transmits the VNF creation request to the NFVO 10, and the NFVO 10 includes: the storage unit 120 that stores VIM information 200 in which setting information regarding the VIM 30 including location information regarding the deployment position of the VIM 30 itself is stored and physical device/virtual resource information 300 in which state information of the physical device 5 and the virtual resource 7 of each NFVI 40 is stored; and the VIM selection unit 102 that, by using the location information included in the VNF creation request, extracts the VIM 30 that satisfies a requirement of the location information with reference to the VIM information 200, and selects, from among the extracted VIMs 30, the VIM 30 that satisfies a creation requirement other than the location information with reference to the physical device/virtual resource information 300.

Thus, in the network virtualization system 1000 according to the present embodiment, location information can be included in the parameter related to the VIM information 200. This enables the NFVO 10 to select the VIM 30 in consideration of the location information, as compared with the conventional case where the service user himself/herself needs to grasp and manage the IP address of the VIM 30 and determine and select the VIM 30 that manages the appropriate virtual resource 7. Therefore, it is possible to improve work efficiency of specifying and selecting an area for the VIM 30 that manages the virtual resource 7.

The virtual resource management device (NFVO 10) according to the present invention is the virtual resource management device of the network virtualization system 1000 that creates a VNF on the virtual resource 7, in which the network virtualization system 1000 includes: the NFVI 40 that provides a virtual infrastructure by allocating the virtual resource 7 on the plurality of physical devices 5; the VIM 30 that controls the physical device 5 and the virtual resource 7 of the NFVI 40; the virtual resource management device as the NFVO 10 that selects the VIM 30 that controls the NFVI 40 that deploys the virtual resource 7 that creates the VNF, from among a plurality of sets of the NFVI 40 and the VIM 30 deployed at any same position; and the VNFM 20 that requests the selected VIM 30 to allocate the virtual resource 7, and the virtual resource management device includes: the storage unit 120 that stores VIM information 200 in which setting information regarding the VIM 30 including location information regarding a deployment position of the VIM 30 itself is stored and physical device/virtual resource information 300 in which state information of the physical device 5 and the virtual resource 7 of each NFVI 40 is stored; and the VIM selection unit 102 that, upon acquiring a VNF creation request including location information in a creation requirement of the VNF, extracts the VIM 30 that satisfies a requirement of the location information with reference to the VIM information 200, and selects, from among the extracted VIMs 30, the VIM 30 that satisfies a creation requirement other than the location information with reference to the physical device/virtual resource information 300.

Thus, in the virtual resource management device (NFVO 10) according to the present embodiment, location information can be included in the parameter related to the VIM information 200. This enables the virtual resource management device to select the VIM 30 in consideration of the location information, as compared with the conventional case where the service user himself/herself needs to grasp and manage the IP address of the VIM 30 and determine and select the VIM 30 that manages the appropriate virtual resource 7. Therefore, it is possible to improve work efficiency of specifying and selecting an area for the VIM 30 that manages the virtual resource 7.

In the virtual resource management device, the location information is identification information indicating an area where a set of the NFVI 40 and the VIM 30 is deployed, and the VIM selection unit 102 extracts the VIM 30 located in the same area as the area indicated by the location information included in the VNF creation request with reference to the VIM information 200.

Thus, by using identification information indicating the area as the location information, the virtual resource management device can reliably select the VIM 30 located in the same area as the area indicated by the location information included in the VNF creation request.

In the virtual resource management device, the location information is information indicating latitude/longitude where a set of the NFVI 40 and the VIM 30 is deployed, and the VIM selection unit 102 extracts the VIM 30 located within a predetermined distance from a position indicated by latitude/longitude that is location information included in the VNF creation request with reference to the VIM information 200.

Thus, by using information indicating latitude/longitude as the location information, the virtual resource management device can reliably select the VIM 30 located within a predetermined distance from the latitude/longitude indicated by the location information included in the VNF creation request.

In the virtual resource management device, the location information is weight information indicating the distance between the reference VIM 30 and each VIM 30 itself, and the VIM selection unit 102 extracts the VIM 30 in which a value within the value indicated by weight information that is location information included in the VNF creation request is set with reference to the VIM information 200.

Thus, by using weight information as the location information, the virtual resource management device can reliably select the VIM 30 in which a value within the value indicated by weight information that is location information included in the VNF creation request.

Note that the present invention is not limited to the embodiment described above, and many modifications can be made by a person having ordinary knowledge in the art within the technical idea of the present invention.

The weight information indicating the location information according to the present embodiment is stored in the VIM information 200 in advance as information in which the magnitude of the distance between the VIM 30 and another VIM 30 is compared with a predetermined distance based on the position of the VIM 30 designated by the user, for example.

As this modification, weight information based on a deployment position of a specific VIM 30 is not stored in the VIM information 200 in advance, and information (e.g., latitude/longitude, address, and the like) that can specify the position of the VIM 30 is registered in the VIM information 200. Then, the VIM selection unit 102 of the NFVO 10 may acquire the VNF creation request including the information of the reference VIM 30, and calculate the VIM 30 within a predetermined distance from the position indicated by the position information of the reference VIM 30, based on the information of the deployment position of each VIM 30. Also by doing so, the NFVO 10 (virtual resource management device) can select the optimal VIM 30.

REFERENCE SIGNS LIST

1 virtual resource management function group (NFV MANO)
5 physical device
6 virtualization layer
7 virtual resource
8 management terminal
9 client terminal
10 virtual resource management device (NFVO)
20 VNFM
30 VIM
40 NFVI
100 control unit
101 location information management unit
102 VIM selection unit
103 physical device/virtual resource information management unit
110 input/output unit
120 storage unit
200 VIM information
300 physical device/virtual resource information
1000 network virtualization system

The invention claimed is:

1. A network virtualization system that creates a virtual network function (VNF) on a virtual resource,
the network virtualization system comprising: an NFV infrastructure (NFVI) that provides a virtual infrastructure by allocating the virtual resource on a plurality of physical devices; a virtualized infrastructure manager (VIM) that controls the physical device and the virtual resource of the NFVI; an NFV orchestrator (NFVO) that selects a VIM that controls an NFVI that deploys a virtual resource that creates the VNF, from among a plurality of sets of the NFVI and the VIM deployed at any same position; and a VNF manager (VNFM) that requests a selected VIM to allocate the virtual resource, wherein
the VNFM includes
a VNF information management unit, including one or more processors, configured to, upon receiving a VNF creation request including location information in a creation requirement of the VNF, transmit the VNF creation request to the NFVO, and
the NFVO includes:
a storage medium configured to store VIM information in which setting information regarding a VIM including location information regarding a deployment position of the VIM itself is stored and physical device/virtual resource information in which state information of the physical device and the virtual resource of each NFVI is stored; and
a VIM selection unit, including one or more processors, configured to, by using the location information included in the VNF creation request, extract a VIM that satisfies a requirement of the location information with reference to the VIM information, and select, from among the extracted VIMs, a VIM that satisfies a creation requirement other than the location information with reference to the physical device/virtual resource information.

2. A virtual resource management device of a network virtualization system that creates a VNF on a virtual resource, wherein
the network virtualization system includes: a NFVI that provides a virtual infrastructure by allocating the virtual resource on a plurality of physical devices; a VIM that controls the physical device and the virtual resource of the NFVI; the virtual resource management device as an NFVO that selects a VIM that controls an NFVI that deploys a virtual resource that creates the VNF, from among a plurality of sets of the NFVI and the VIM deployed at any same position; and a VNFM that requests a selected VIM to allocate the virtual resource, and
the virtual resource management device includes:
a storage medium configured to store VIM information in which setting information regarding a VIM including location information regarding a deployment position of the VIM itself is stored and physical device/virtual resource information in which state information of the physical device and the virtual resource of each NFVI is stored; and
a VIM selection unit, including one or more processors, configured to, upon acquiring a VNF creation request including location information in a creation requirement of the VNF, extract a VIM that satisfies a requirement of the location information with reference to the VIM information, and select, from among the extracted VIMs, a VIM that satisfies a creation requirement other than the location information with reference to the physical device/virtual resource information.

3. The virtual resource management device according to claim 2, wherein
the location information is identification information indicating an area where a set of the NFVI and the VIM is deployed, and
the VIM selection unit is configured to extract a VIM located in a same area as an area indicated by location information included in the VNF creation request with reference to the VIM information.

4. The virtual resource management device according to claim 2, wherein
the location information is information indicating latitude/longitude where a set of the NFVI and the VIM is deployed, and
the VIM selection unit is configured to extract a VIM located within a predetermined distance from a position indicated by latitude/longitude that is location information included in the VNF creation request with reference to the VIM information.

5. The virtual resource management device according to claim 2, wherein
the location information is weight information indicating a distance between a reference VIM and each VIM itself, and
the VIM selection unit is configured to extract a VIM in which a value within a value indicated by weight information that is location information included in the VNF creation request is set with reference to the VIM information.

6. A virtual resource management method by a virtual resource management device of a network virtualization system that creates a VNF on a virtual resource, wherein
the network virtualization system includes: a NFVI that provides a virtual infrastructure by allocating the virtual resource on a plurality of physical devices; a VIM that controls the physical device and the virtual resource of the NFVI; the virtual resource management device as an NFVO that selects a VIM that controls an NFVI that deploys a virtual resource that creates the VNF, from among a plurality of sets of the NFVI and the VIM deployed at any same position; and a VNFM that requests a selected VIM to allocate the virtual resource,
the virtual resource management device includes
a storage medium configured to store VIM information in which setting information regarding a VIM including location information regarding a deployment position of the VIM itself is stored and physical device/virtual resource information in which state information of the physical device and the virtual resource of each NFVI is stored, and
the virtual resource management method executes:
acquiring a VNF creation request including location information in a creation requirement of the VNF; and
extracting a VIM that satisfies a requirement of the location information with reference to the VIM information and selecting, from among the extracted VIMs, a VIM that satisfies a creation requirement other than the location information with reference to the physical device/virtual resource information.

7. The virtual resource management method according to claim 6, wherein
the location information is identification information indicating an area where a set of the NFVI and the VIM is deployed, and
the virtual resource management method comprises:
extracting a VIM located in a same area as an area indicated by location information included in the VNF creation request with reference to the VIM information.

8. The virtual resource management method according to claim 6, wherein
the location information is information indicating latitude/longitude where a set of the NFVI and the VIM is deployed, and
the virtual resource management method comprises:
extracting a VIM located within a predetermined distance from a position indicated by latitude/longitude that is location information included in the VNF creation request with reference to the VIM information.

9. The virtual resource management method according to claim 6, wherein
the location information is weight information indicating a distance between a reference VIM and each VIM itself, and
the virtual resource management method comprises:
extracting a VIM in which a value within a value indicated by weight information that is location information included in the VNF creation request is set with reference to the VIM information.

* * * * *